United States Patent [19]
Evans

[11] Patent Number: 6,092,652
[45] Date of Patent: Jul. 25, 2000

[54] MOLDED CONTAINER

[76] Inventor: Dale M Evans, 6674 Chestnut Cir., Windsor, Wis. 53598

[21] Appl. No.: 09/289,416

[22] Filed: Apr. 9, 1999

Related U.S. Application Data

[60] Provisional application No. 60/085,455, May 14, 1998.

[51] Int. Cl.[7] .................................................. B65D 85/57
[52] U.S. Cl. ..................... 206/308.1; 206/313; 206/232; 220/607; 220/9.4
[58] Field of Search ................................ 206/307, 307.1, 206/308.1, 308.3, 309, 310, 311, 312, 313, 232; 220/607, 608, 668, 9.2, 9.4

[56] References Cited

U.S. PATENT DOCUMENTS

| Re. 33,294 | 8/1990 | Fujii et al. ............................... 206/387 |
| 3,351,228 | 11/1967 | Huisman .................................. 220/607 |
| 3,905,510 | 9/1975 | Johnson .................................. 220/607 |
| 3,917,108 | 11/1975 | Thurman .................................. 220/607 |
| 4,140,828 | 2/1979 | Copping .................................. 220/608 |
| 4,199,061 | 4/1980 | Harkelroad et al. ..................... 206/232 |
| 4,327,831 | 5/1982 | Inaba et al. ............................. 206/310 |
| 4,911,298 | 3/1990 | Miyagawa et al. ....................... 206/387 |
| 5,377,825 | 1/1995 | Sykes ...................................... 206/232 |
| 5,573,176 | 11/1996 | Applegate ............................... 229/162 |
| 5,685,452 | 11/1997 | Kristoffersson ......................... 220/607 |
| 5,692,607 | 12/1997 | Brosmith et al. ........................ 206/313 |
| 5,735,396 | 4/1998 | Condorodis ........................... 206/308.1 |

FOREIGN PATENT DOCUMENTS

| 0875898 A1 | 11/1998 | European Pat. Off. . |
| 2568859 | 5/1984 | France . |
| 2282797 | 4/1995 | United Kingdom . |

OTHER PUBLICATIONS

PCT Search Report dated Oct. 7, 1999 in Appln. No. PCT/US99/10781.

Primary Examiner—Paul T. Sewell
Assistant Examiner—Jila M. Mohandesi
Attorney, Agent, or Firm—Quarles & Brady LLP

[57] ABSTRACT

A molded container having a base and a cover includes a network of segments that define a plurality of apertures through the base and the cover. Although the container retains structural strength, the weight of the container is substantially reduced by virtue of the apertures, thereby reducing the tonnage required to secure the mold during manufacture and reducing the cost of each container. The container can optionally be provided with a flexible sheet to cover the apertures.

15 Claims, 3 Drawing Sheets

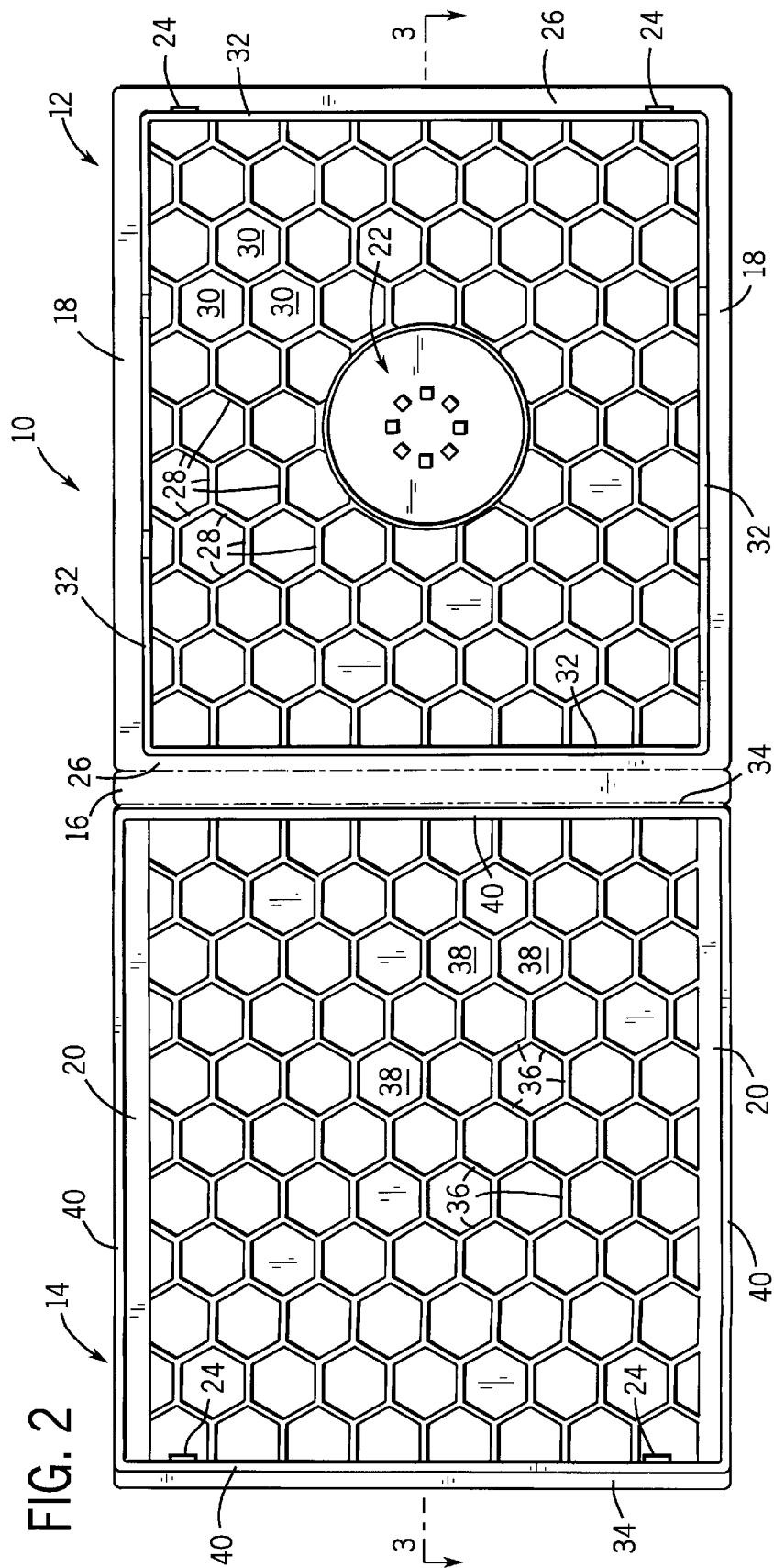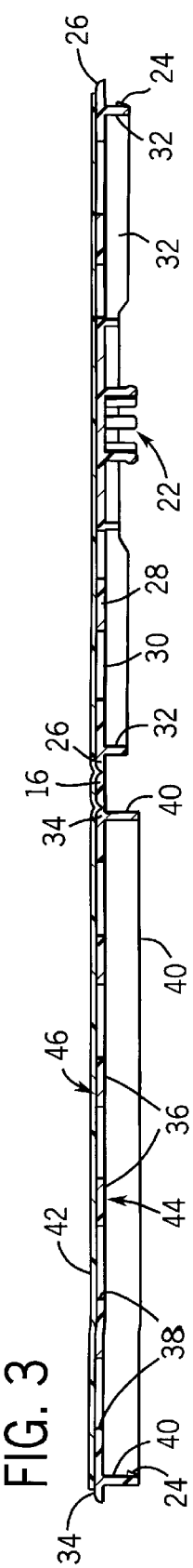

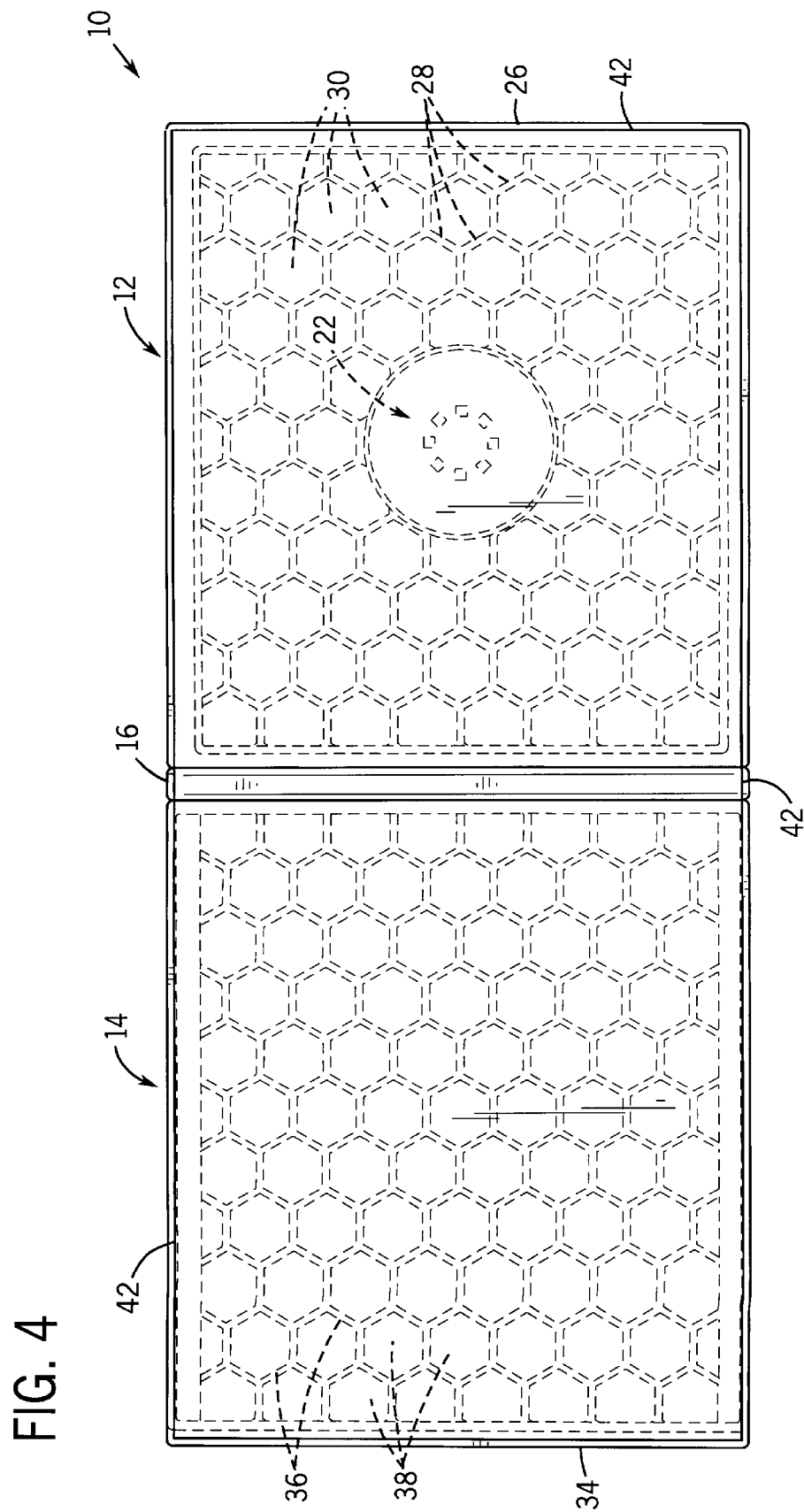

MOLDED CONTAINER

CROSS-REFERENCE TO RELATED APPLICATIONS

This application claims the priority benefit of U.S. Provisional Patent Application No. 60/085,455 filed on May 14, 1998.

STATEMENT REGARDING FEDERALLY SPONSORED RESEARCH OR DEVELOPMENT

Not applicable.

BACKGROUND OF THE INVENTION

Containers for audio or video cassettes, compact discs, CD-ROMs, diskettes and the like can be prepared by injection molding, and by other methods. A wide variety of such holders are now commercially available.

Conventional injection molded containers, holders or cases known to the inventor are solid and, as such, require a significant amount of thermoplastic material as well as substantial tonnage to clamp the mold shut in the molding process. It would be advantageous to reduce the amount of material used in such holders, while retaining sufficient structural strength ("stiffness") to prevent damage to contents in normal usage.

BRIEF SUMMARY OF THE INVENTION

The present invention is summarized in that an injection molded container, holder or case for carrying audio or video cassettes, compact discs, CD-ROMs, diskettes and the like is improved by providing apertures in one or more surfaces thereof in a regular or irregular pattern. The apertures are provided in portions of the surfaces that are not involved in securing the contents in the case or in folding or closing the case. The structural strength of the holder is maintained because thermoplastic material remains around the periphery of the case and between the apertures. The case is most advantageously employed to hold non-flowable, preferably solid, contents.

In a related aspect, the present invention is summarized in that at least one flexible sheet optionally secured to the interior or exterior of the case seals the apertures in the case thereby protecting the case contents from dust and other particulates that could otherwise pass through the apertures. If the seal between the sheet and the case is sufficiently strong, the sheet can also function to prevent egress of contents small enough to fit through the apertures provided.

It is an object of the present invention to reduce the weight, and thereby reduce the cost, of an injection molded container without sacrificing structural strength.

It is another object of the present invention to reduce the tonnage requirements of manufacturing such articles, thereby increasing the manufacturing volume.

It is an advantage of the present invention that the amount of thermoplastic material required to mold the improved case is significantly less than that previously required. For example, the amount of material can be reduced by about 50% without appreciable loss of structural strength.

It is another advantage of the present invention that the amount of tonnage required to mold the improved case is also reduced in proportion to the reduction in material per case.

It is another advantage of the present invention that the manufacturing cycle time is reduced in proportion to the reduction in material per case, since less cooling time is required in each molding step.

It is still another advantage of the present invention that the shipping costs associated with the product are reduced in proportion to the reduction in material per case.

It is still another advantage of the present invention that when more than one flexible sheet is provided on the case, the sheets can form a sleeve into which printed matter can be inserted.

It is yet another advantage of the present invention that the flexible sheet can be secured to the molded article in a single step during manufacture of the molded article.

It is a feature of the present invention that the flexible sheet can comprise informational indicia thereupon or, in the case of a pair of flexible sheets, therebetween.

It is another feature of the present invention that the flexible sheet and the case can comprise recycled materials.

It is still another feature of the present invention that the flexible sheet and the article can comprise the same materials, thereby facilitating the use of recycled materials in manufacture and the ease with which the case is ultimately recycled.

Additional objects, features and advantages will become apparent upon consideration of the following detailed description.

BRIEF DESCRIPTION OF THE SEVERAL VIEWS OF THE DRAWINGS

FIG. 2 depicts an interior plan view of the holder of FIG. 1 in an unfolded position;

FIG. 3 depicts a cross sectional view along line 3—3 of the holder of FIG. 2;

FIG. 4 depicts an exterior plan view of the holder of FIG. 1 in an unfolded position;

DETAILED DESCRIPTION OF THE INVENTION

Figure 1:
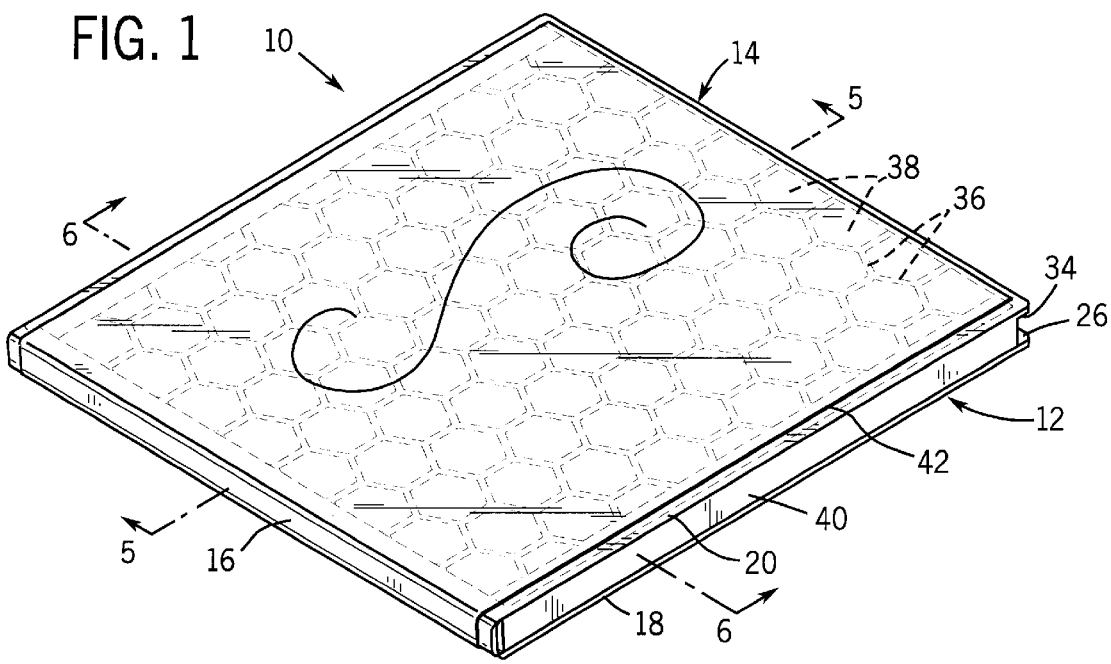
FIG. 1 depicts a perspective top view of a closed compact disc holder manufactured in accord with the present invention.

A case 10 of the present invention for holding contents (not shown), such as an audio or video cassette, a compact disc, a CD-ROM, a diskette and the like, is exemplified by FIGS. 1–6. As shown in FIG. 1, the case 10 has a base 12 with a means 22 for securing contents in the case, and a cover 14 which folds over the base 12 to enclose the contents in the case 10. These designations are provided only for convenient reference and are not intended to limit the invention in any way.

Looking particularly at FIGS. 2–4, the case 10 which, when formed, is a substantially flat article having a conventional living hinge 16 connecting the base 12 and the cover 14, conventional support limbs 18, 20 therebetween, conventional means 22 for securing the contents in the case 10, and a conventional latch 24 or latches. Such aspects of the structure are familiar to one skilled in the art and are not considered further in detail herein. A preferred material for the case 10 is polypropylene, since it is relatively inexpensive and forms a strong hinge. Any material conveniently used in an injection molding process would also be suitable. A mold for producing the products of the present invention can be produced according to known manufacturing processes, although the applicants consider a mold for producing the products to be an aspect of the invention.

Figure 5:
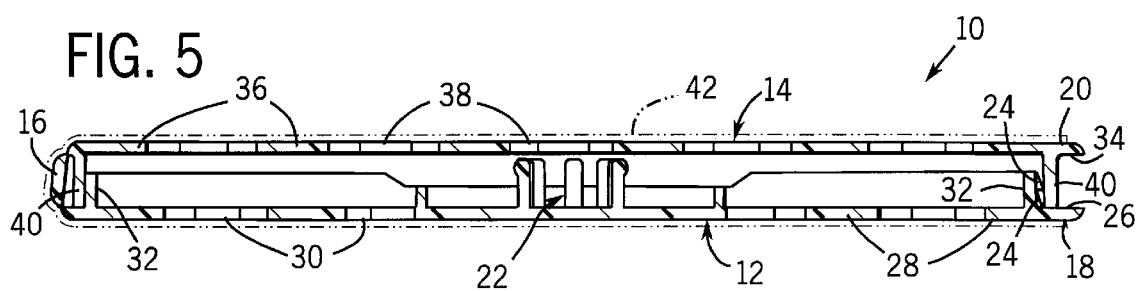
FIG. 5 depicts a cross sectional side view along line 5—5 of the holder of FIG. 1.
Figure 6:
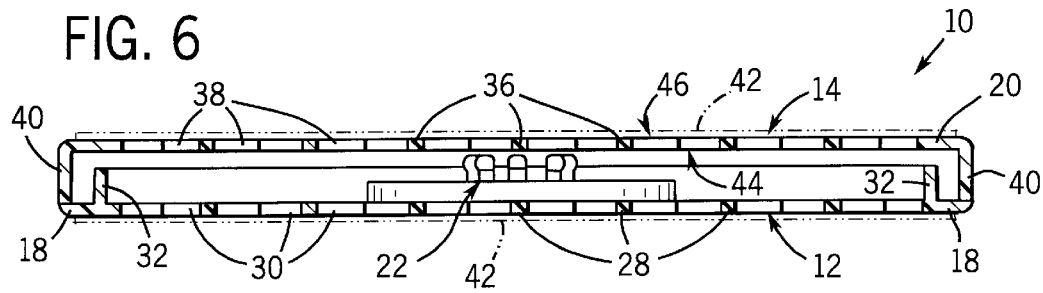
FIG. 6 depicts a cross sectional view along line 6—6 of the holder of FIG. 1.

Referring to FIGS. 2 and 3, the base 12 has a pair of spaced support limbs 18 joined by spaced edges 26 forming a frame having an opening. Segments 28 of interconnected molded portions of the base 12, are disposed in the opening and define a plurality of hexagonal apertures 30. As shown in FIGS. 5 and 6, when the case 10 is in a folded position, ribs 32 formed on an interior surface of the support limbs 18 and edges 26 enclose the case contents.

Referring back to FIG. 2, the molded segments 28 are connected to both the means 22 for securing the contents and the peripheral support limbs 18 and edges 26, so that the base 12 remains substantially rigid and continues to support the contents thereof. Although hexagonal apertures 30 are defined in the exemplified embodiment, it is understood that the apertures 30 can be any of a wide variety of convenient shapes including circles, ovals, squares, rectangles, trapezoids, triangles, diamonds, and the like. The shape of the aperture is not intended to be a limitation on the invention. It is likewise intended that the arrangement of shapes need not be a regular or repeating pattern, but that an irregular pattern is also suitable. The arrangement, position, and size of apertures can be adjusted to facilitate the injection molding process so as, for example, to distribute pressure evenly throughout the article during the molding process.

The cover 14 is substantially similar to the base 12 having a pair of spaced support limbs 20 joined by spaced edges 34 forming a frame having an opening. Segments 36 of interconnected molded portions of the cover 14 are disposed in the cover opening and define a plurality of apertures 38. The molded segments 36 are connected to the support limbs 20 and edges 34, so that the cover 14 remains substantially rigid.

Looking particularly at FIGS. 5 and 6, when the case 10 is in the folded position, ribs 40 formed on an interior surface of the support limbs 20 and edges 34 abut the base and overlap the base ribs 32 to fully enclose the case contents. Interlocking latches 24 may be formed in base 12 and cover 14 portions, such as the ribs 32, 40 to latch the case 10 in the folded position.

As shown in FIGS. 1, 3–6, a flexible sheet 42 secured to the case 10 covers the apertures 30, 38 formed thereon and prevents particulates from contaminating the case contents. The sheet 42 can be provided on the interior 44 or exterior 46 of the case 10. The interior 44 is defined as the surfaces of the base 12 and cover 14 which face the contents in the folded position. The other side of the base 12 and cover 14 is the exterior 46. It is preferred that the sheet 42 be lightweight. Advantageously, the flexible sheet 42 can include informational indicia thereupon, including, but not limited to marketing, price, instructions, etc.

When the case 10 is covered by a flexible sheet 42, it is preferred that the sheet 42 and the case 10 to be manufactured using compatible materials that can bond to one another during manufacture. In that case, the flexible sheet 42 would be bound to the case 10 not only at its periphery, but at all points in which the sheet 42 and the case 10 come in contact. For example, if the article is manufactured of polypropylene, the flexible sheet is preferably also polypropylene or paper, both of which would bond well to the article.

Although a single sheet 42 covering both the base 12 and cover 14 is preferred, separate sheets secured to the base 12 and cover 14 may be used without departing from the scope of the present invention. If a single flexible sheet 42 in bound contact with the case 10 is provided, it may not be necessary to provide the case 10 with a living hinge 16. Rather, the sheet 42 can be arranged so as to function as a hinge in the finished article. Advantageously, as a result of slight shrinkage by the case 10 after cooling, a polypropylene sheet 42 bound as described to the segments 28, 36 can comprise small convex or concave sections that can cushion the case and protect the contents.

The case base 12 and cover 14 are readily manufactured by injection molding using a conventional mold adapted and shaped to provide the final product with apertures therethrough. As noted, the throughput of a process for manufacturing such articles is improved by virtue of the reduced weight of the finished articles. If a flexible sheet 42 is provided, it can be molded directly into the case 10 during manufacture using conventional processes for in-mold labeling.

Figure 7:
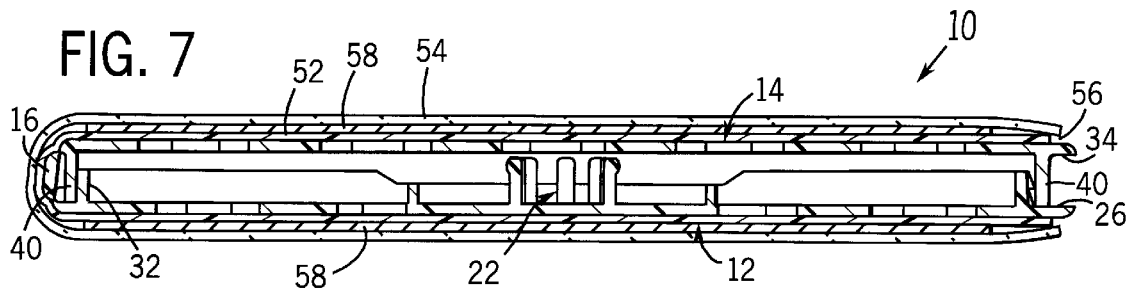
FIG. 7 depicts a cross sectional side view of an alternative embodiment of a closed compact disc holder having a sleeve.

In the alternative embodiment shown in FIG. 7, like components are referenced using the same reference numbers as the embodiment described above. In the alternative embodiment shown in FIG. 7, an inmold sleeve 50 formed from two flexible sheets 52, 54, or a single folded sheet, defining a pouch 56 is bonded to the base 12 and cover 14, such as described for the sheet 42 described above. The sleeve 50, such as a polypropylene bag, can function as the flexible sheet 42. Advantageously, the pouch 56 can receive printed matter 58 or other substantially flat matter therein.

Of course it will be understood that the invention relates to any molded container of the type described having apertures therethrough and is not limited to the particular containers exemplified herein, since all such containers can be advantageously improved by reducing their weight. For example, although a case having apertures for holding a video tape is not shown, its construction is enabled to one skilled in the art in possession of the invention, since such a case is otherwise conventional.

I claim:

1. A molded container, suitable for holding articles such as an audio cassette, video cassette, compact disc, CD-ROM, or diskettes, said container comprising:

a base having opposing edges;

a cover having spaced support limbs joined by opposing edges defining a cover opening, wherein one of said cover edges is hingedly connected to one of said base edges;

segments of interconnected molded portions disposed in said cover opening defining cover apertures; and a flexible sheet secured to at least one of said molded portions, and covering at least one of said apertures.

2. The molded container as in claim 1, in which said flexible sheet covers all of said apertures.

3. The molded container as in claim 2, wherein said flexible sheet is secured to said base and cover forming a hinge.

4. The molded container as in claim 2, wherein said sheet is secured to an interior surface of said container.

5. The molded container as in claim 2, wherein said sheet is secured to an exterior surface of said container.

6. The molded container as in claim 2, wherein said sheet is secured by direct molding to a surface of said container.

7. The molded container as in claim 2, wherein said sheet has convex sections.

8. The molded container as in claim 2, wherein said sheet has concave sections.

9. The molded container as in claim 2, wherein said sheet has indicia printed thereon.

10. The molded container as in claim 2, wherein said sheet is a sleeve having a pouch.

11. The molded container as in claim 2, wherein said sheet is a material selected from the group consisting of a thermoplastic material and paper.

12. The molded container as in claim 1, wherein a living hinge joins said base and said cover.

13. The molded container as in claim 1, wherein said base and cover are formed from a thermoplastic material.

14. The molded container as in claim 13, wherein said thermoplastic material is polypropylene.

15. The molded container as in claim 1, wherein said base has spaced support limbs joined by said opposing base edges defining a base opening, and segments of interconnected molded portions disposed in said base opening defining base apertures.

* * * * *